United States Patent
Kim et al.

(10) Patent No.: US 9,030,217 B2
(45) Date of Patent: May 12, 2015

(54) SEMICONDUCTOR WAFER AND METHOD FOR AUTO-CALIBRATING INTEGRATED CIRCUIT CHIPS USING PLL AT WAFER LEVEL

(75) Inventors: Hyunseok Kim, Jeonllabuk-do (KR); Su Na Choi, Daejeon (KR); Heyung Sub Lee, Daejeon (KR); Cheol Sig Pyo, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 273 days.

(21) Appl. No.: 13/605,554

(22) Filed: Sep. 6, 2012

(65) Prior Publication Data

US 2013/0278309 A1     Oct. 24, 2013

(30) Foreign Application Priority Data

Apr. 23, 2012   (KR) ........................ 10-2012-0042305

(51) Int. Cl.
     *G06K 19/07*      (2006.01)
(52) U.S. Cl.
     CPC ........ *G06K 19/0726* (2013.01); *G06K 19/0722* (2013.01)
(58) Field of Classification Search
     CPC .... G01R 31/28; G01R 31/26; G01R 31/3183; G01R 22/066; G01R 11/24; G01R 11/25; G01R 35/00; G06K 19/07; G06K 19/0722; G06K 19/0726; H03K 17/962

USPC ....................... 324/757.03; 327/157
See application file for complete search history.

(56) References Cited

U.S. PATENT DOCUMENTS

| | | | |
|---|---|---|---|
| 2010/0073051 A1* | 3/2010 | Rao et al. ...................... | 327/157 |
| 2010/0125761 A1 | 5/2010 | Hyun et al. | |
| 2013/0278305 A1* | 10/2013 | Kim et al. ..................... | 327/141 |

FOREIGN PATENT DOCUMENTS

| KR | 10-2010-0054486 A | 5/2010 |
|---|---|---|
| KR | 10-2011-0012507 A | 2/2011 |

\* cited by examiner

*Primary Examiner* — Tung X Nguyen
*Assistant Examiner* — Son Le
(74) *Attorney, Agent, or Firm* — Rabin & Berdo, P.C.

(57) ABSTRACT

In integrated circuit chips that are used for RFID, a method of calibrating an operation frequency that is generated in an operation frequency generator and a semiconductor wafer including a calibration circuit are provided. The method of calibrating an operation frequency of integrated circuit chips includes: supplying DC power to the integrated circuit chips; selecting an integrated circuit chip to perform calibration of an operation frequency; receiving an operation frequency that is generated in the selected integrated circuit chip; calculating a difference between a phase of the operation frequency and a phase of a calibration target frequency; generating a frequency calibration value of the operation frequency using the phase difference; transmitting a control signal including the frequency calibration value to the integrated circuit chip; and releasing a selection of the integrated circuit chip in which calibration of the operation frequency is complete.

7 Claims, 3 Drawing Sheets

SEMICONDUCTOR WAFER AND METHOD FOR AUTO-CALIBRATING INTEGRATED CIRCUIT CHIPS USING PLL AT WAFER LEVEL

CROSS-REFERENCE TO RELATED APPLICATION

This application claims priority to and the benefit of Korean Patent Application No. 10-2012-0042305 filed in the Korean Intellectual Property Office on Apr. 23, 2012, the entire contents of which are incorporated herein by reference.

BACKGROUND OF THE INVENTION (a) Field of the Invention

The present invention relates to a method of auto-calibrating integrated circuit chips at a wafer level. More particularly, the present invention relates to a method of auto-calibrating integrated circuit chips in order to uniformly improve performance of integrated circuit chips that are used for radio frequency identification (referred to as 'RFID') or an ubiquitous sensor network (referred to as 'USN') at a wafer level using a phase-locked loop (PLL).

(b) Description of the Related Art

In general, RFID is technology that stores information at a tag that is formed in a form of integrated circuit chips or reads the stored information from the tag using a radio frequency. RFID technology may be used for identification, tracing, and management of vehicles, physical distribution, or animals according to a band of a radio frequency, or may be used for a traffic card. In this way, in order to apply RFID technology to a wide field, mass production technology of super-cheap tag chips is requested. For mass production of super-cheap tag chips, in a process of designing integrated circuit chips, an area of the chips should be minimized, and by decreasing an inferiority rate through performance calibration, a production cost should be lowered and a production time of the integrated circuit chips should be shortened.

In general, a chip that is formed with only a digital logic circuit is less influenced by a process change, but a radio frequency (RF)/analog chip including many passive elements is influenced by a process change and thus the radio frequency (RF)/analog chip does not have completely uniform performance. Particularly, in tag chips that are used for RFID, in an operation frequency generation circuit using a capacitor element or in a bias circuit using a resistor element, a failure occurrence probability is high. This is because many passive elements are included in the circuits, and a characteristic value of a resistor and a capacitor constituting the circuit may be changed by 10% or more according to a wafer.

Conventionally, in order to calibrate a performance change according to such a process change, laser trimming technology has been used, or a separate calibration circuit was added at the inside of integrated circuit chips. However, in laser trimming technology, time is additionally consumed, and when a calibration circuit is added, there is a drawback that an area of a chip increases and thus it is difficult to apply the above technology for mass production of super-cheap tag chips.

Further, at a wafer level, a method of testing an RFID tag chip with an on-wafer or a method of calibrating performance of a tag using a one-time programmable memory was suggested. However, the method of testing an RFID tag chip with an on-wafer is a method of verifying only whether a tag chip is defective, and in the method of calibrating performance of a tag using a one-time programmable memory, a relatively large amount of time is consumed in performance calibration of an individual tag chip and thus there is a problem that the production cost of the tag increases.

SUMMARY OF THE INVENTION

The present invention has been made in an effort to provide a method of auto-calibrating integrated circuit chips at a wafer level having advantages of rapidly calibrating performance of integrated circuit chips at a wafer level. In general, when adjusting performance of a circuit that outputs a digital value, performance of a plurality of integrated circuit chips can be rapidly calibrated, and an inferiority rate can be reduced. Therefore, by calibrating a frequency that is generated in an operation frequency generator that outputs a digital value rather than calibrating performance of a bias circuit that outputs an analog value, it is reasonable to calibrate the performance of all the integrated circuit chips. The present invention has been made in an effort to further provide a method of auto-calibrating integrated circuit chips at a wafer level having advantages of auto-calibrating an operation frequency of integrated circuit chips at a wafer level using a PLL.

An exemplary embodiment of the present invention provides a method of calibrating an operation frequency of integrated circuit chips. The method includes: supplying DC power to the integrated circuit chips; selecting an integrated circuit chip to perform calibration of an operation frequency; receiving an operation frequency that is generated in the selected integrated circuit chip; calculating a difference between a phase of the operation frequency and a phase of a calibration target frequency; generating a frequency calibration value of the operation frequency using the phase difference; transmitting a control signal including the frequency calibration value to the integrated circuit chip; and releasing a selection of the integrated circuit chip in which calibration of the operation frequency is complete.

The method may further include, after the transmitting of a control signal, calibrating the operation frequency according to the frequency calibration value that is included in the control signal, and storing the frequency calibration value at the integrated circuit chip according to the control signal.

Another embodiment of the present invention provides a semiconductor wafer for auto-calibrating an operation frequency of integrated circuit chips. The semiconductor wafer includes: an integrated circuit chip area; a probe area in which a calibration controller of an operation frequency is connected to the outside of the semiconductor wafer; a signal transmitting area that is connected to the probe area to transmit a signal of the integrated circuit chips to the calibration controller; and a buffer that relays a signal that is exchanged between the integrated circuit chips and the signal transmitting area.

The signal transmitting area may include: a chip selection bus that transmits a selection signal of the calibration controller for an integrated circuit chip to perform calibration of the operation frequency and a selection release signal for the integrated circuit chip in which calibration of the operation frequency is complete; an external power line that transmits DC power that is supplied to the integrated circuit chip; a frequency measurement line that transmits an operation frequency that is generated in the integrated circuit chip; and a calibration bus that transmits a control signal for calibrating the operation frequency, wherein the chip selection bus, the external power line, the frequency measurement line, and the calibration bus may be connected to the probe area.

The buffer may be positioned at an end portion of the chip selection bus and operate according to a selection signal and a selection release signal of the calibration controller, and when the buffer operates, a connection between the integrated circuit chip, the external power line, the frequency measurement line, and the calibration bus may be activated.

Yet another embodiment of the present invention provides a calibration controller for auto-calibrating an operation frequency of integrated circuit chips. The calibration controller generates an operation frequency calibration value using the phase difference, and includes a phase-locked loop that calculates a phase difference by comparing a phase of a calibration target frequency and a phase of the operation frequency.

DETAILED DESCRIPTION OF THE EMBODIMENTS

Figure 1:
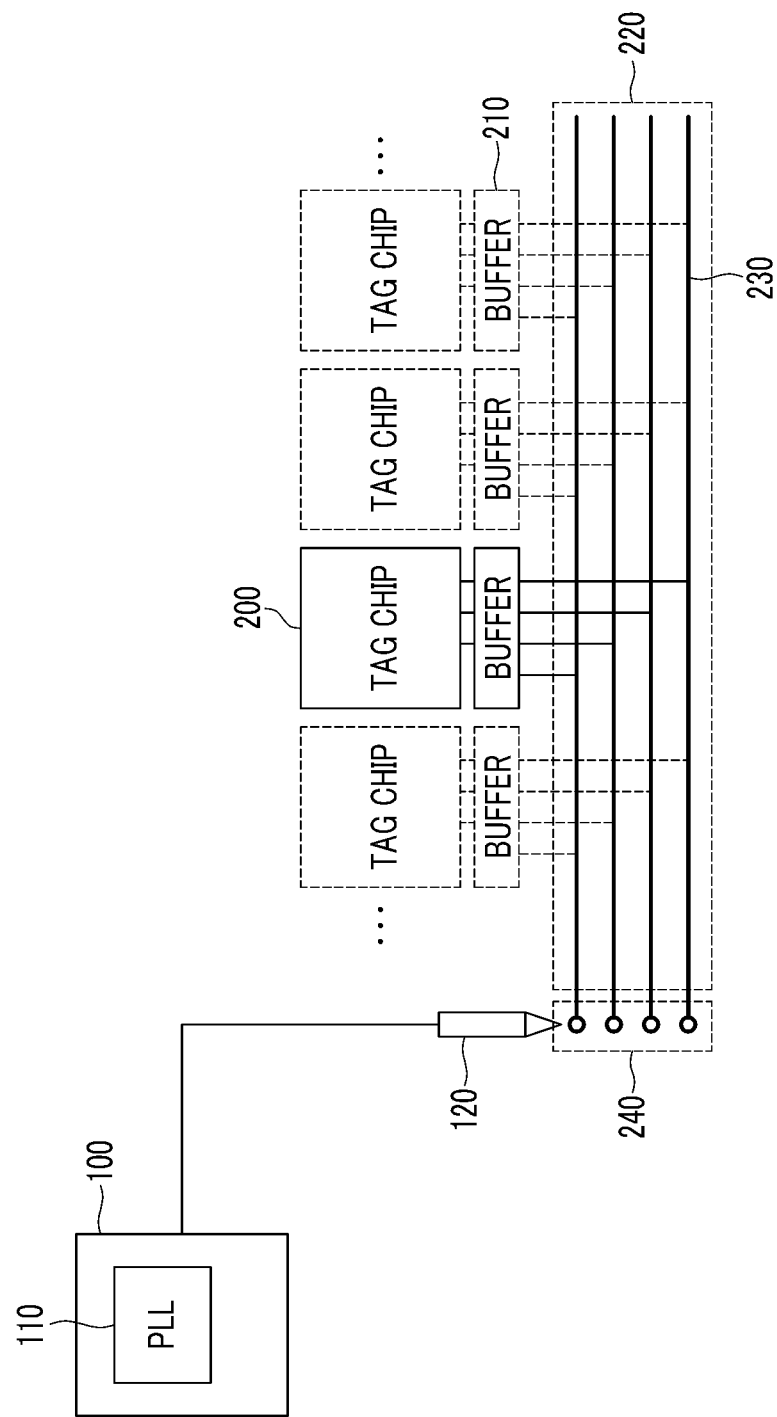
FIG. 1 is a diagram illustrating a tag chip auto-calibration system of a wafer level according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In addition, in the entire specification and claims, unless explicitly described to the contrary, the word "comprise" and variations such as "comprises" or "comprising" will be understood to imply the inclusion of stated elements but not the exclusion of any other elements.

Hereinafter, a method of auto-calibrating integrated circuit chips of a wafer level according to an exemplary embodiment of the present invention will be described in detail with reference to the drawings. For convenience of description, tag chips as an example of an integrated circuit chip will be described.

FIG. 1 is a diagram illustrating a tag chip auto-calibration system of a wafer level according to an exemplary embodiment of the present invention.

Referring to FIG. 1, a tag chip auto-calibration system of a wafer level according to an exemplary embodiment of the present invention includes a calibration controller 100, a probe pin 120, and a semiconductor wafer including a plurality of tag chips 200, buffers 210, a signal transmitting area 220, a plurality of signal lines 230, and a probe area 240.

The calibration controller 100 includes a PLL 110, and electrically connects the semiconductor wafer and the calibration controller 100 by enabling the probe pin 120 to contact the probe area 240, thereby performing frequency calibration of the tag chip 200.

The probe pin 120 is connected to the calibration controller 100 that is positioned at the outside of the semiconductor wafer to contact the probe area 240 of the semiconductor wafer.

The plurality of tag chips 200 are integrated circuit chips that are formed on the semiconductor wafer. The plurality of tag chips 200 are each divided by a scribe line, and after a frequency calibration process according to an exemplary embodiment of the present invention is performed, the plurality of tag chips 200 are cut out along the scribe line to perform a function as a single chip.

The buffer 210 relays a signal that is exchanged between the tag chip 200 and the signal transmitting area 220. When a specific tag chip 200 to perform a calibration process through the buffer 210 is selected, and when the buffer 210 operates, a signal exchange between the calibration controller 100 and the tag chip 200 may be performed. Further, the buffer 210 buffers a signal between the probe area 240 and the tag chip 200.

The signal transmitting area 220 is formed in a scribe area within the semiconductor wafer and includes a plurality of signal lines 230.

The buffer 210, the signal transmitting area 220, and the probe area 240 are included in a scribe area that is formed between the tag chips 200 and may be removed after the tag chips 200 are cut out.

Figure 2:
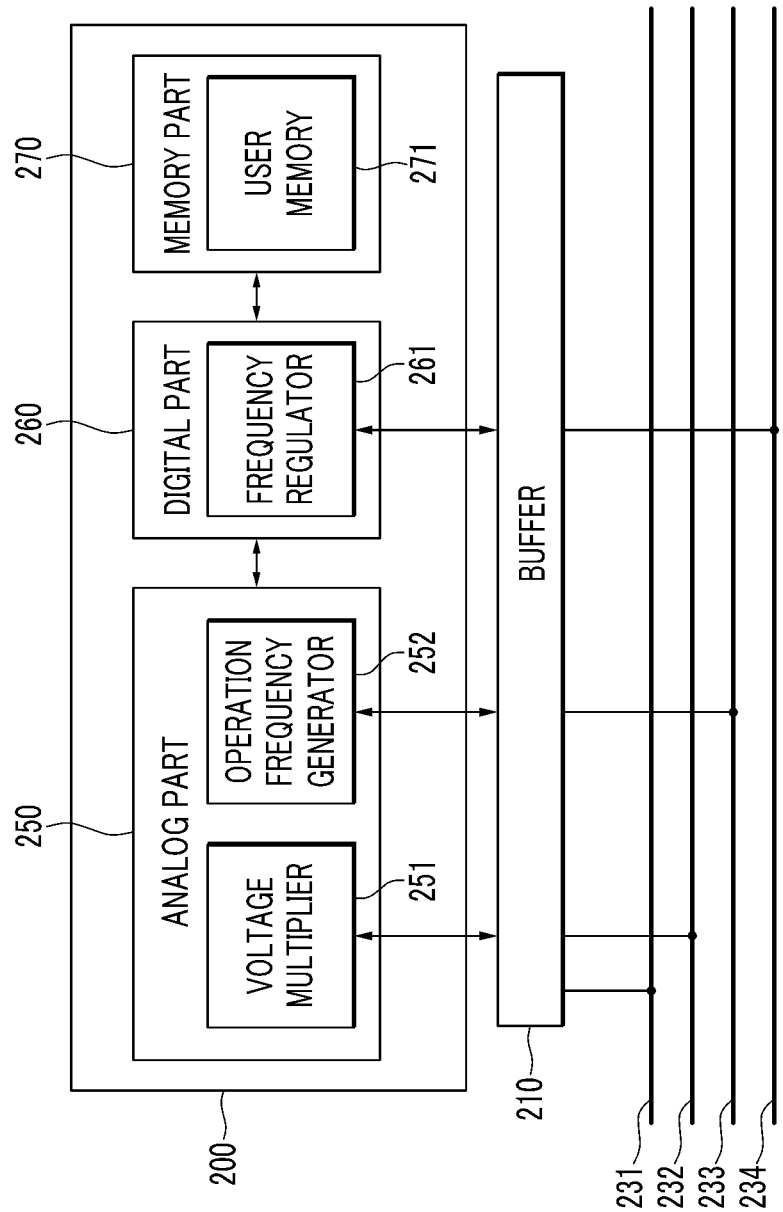
FIG. 2 is a diagram illustrating a semiconductor wafer according to an exemplary embodiment of the present invention.

FIG. 2 is a diagram illustrating a semiconductor wafer according to an exemplary embodiment of the present invention.

Referring to FIG. 2, the signal transmitting area 220 that is formed in a scribe area includes a chip selection bus 231, an external power line 232, a frequency measurement line 233, and a calibration bus 234, while the tag chip 200 includes an analog part 250, a digital part 260, and a memory part 270, and the buffer 210 is positioned between the tag chip 200 and the signal transmitting area 220.

The analog part 250 of the tag chip 200 includes a voltage multiplier 251 and an operation frequency generator 252, the digital part 260 includes a frequency regulator 261, and the memory part 270 includes a user memory 271. The voltage multiplier 251 performs a function of supplying DC power to the tag chip 200, and in an exemplary embodiment of the present invention, calibration controller 100 distributes DC power that is supplied through the external power line 232 to each constituent element of the tag chip 200, instead of the voltage multiplier 251.

The operation frequency generator 252 generates an operation frequency necessary for operation of the tag chip 200, and an operation frequency that is generated in the operation frequency generator 252 is transferred to the calibration controller 100 through the frequency measurement line 233 and is automatically calibrated according to an exemplary embodiment of the present invention.

The frequency regulator 261 is connected to the calibration bus 234 to receive a control signal for calibrating an operation frequency from the calibration controller 100. Thereafter, the frequency regulator 261 reflects calibration contents of an operation frequency to the operation frequency generator 252 and stores a frequency value of the calibrated operation frequency at the user memory 271. The user memory 271 is an area that is separately assigned in order to store a frequency value of an operation frequency and is included in a common memory part 270 of the tag chip 200.

Hereinafter, an operation process of constituent elements of a system according to an exemplary embodiment of the present invention that is shown in FIGS. 1 and 2 will be described with reference to FIG. 3.

Figure 3:
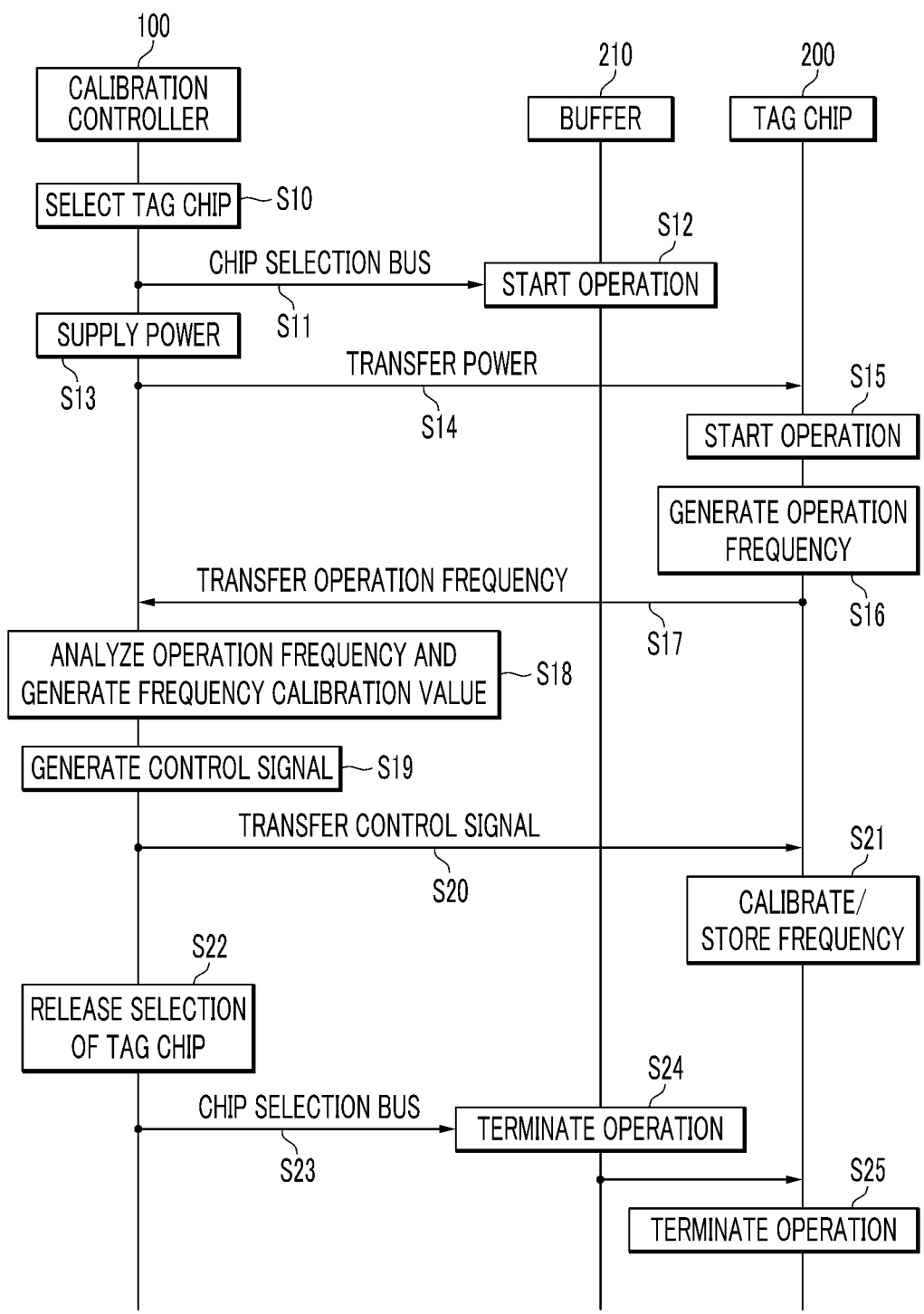
FIG. 3 is a flowchart illustrating a method of auto-calibrating tag chips at a wafer level according to an exemplary embodiment of the present invention.

FIG. 3 is a flowchart illustrating a method of auto-calibrating tag chips at a wafer level according to an exemplary embodiment of the present invention.

Referring to FIG. 3, when the calibration controller 100 selects the tag chip 200 to perform frequency calibration (S10), an auto-calibration process of the tag chip 200 is started. A selection signal of the tag chip 200 that is transmitted by the calibration controller 100 is transmitted to the buffer 210 through the chip selection bus 231 (S11), and thus the buffer 210 operates (S12).

As the buffer 210 operates, a connection between the tag chip 200 and the external power line 232, the frequency measurement line 233, and the calibration bus 234 is activated and thus signals of the calibration controller 100 and the tag chip 200 can be exchanged.

Thereafter, the calibration controller 100 supplies DC power (S13), and the calibration controller 100 transfers the DC power to each constituent element of the tag chip 200 through the external power line 232 (S14) and thus the tag chip 200 operates (S15).

In this case, as shown in FIG. 3, DC power may be supplied through the calibration controller 100, but separate DC power may be directly supplied from the outside of a wafer. In this case, until a calibration process of all tag chips 200 is terminated, DC power may be continuously supplied to the semiconductor wafer, and power supply to each tag chip 200 may be determined according to whether the buffer 210 operates.

Thereafter, the operation frequency generator 252 generates an operation frequency (S16), and the generated operation frequency is transferred to the calibration controller 100 through the frequency measurement line 233 (S17).

The calibration controller 100 analyzes the received operation frequency and generates a frequency calibration value (S18).

In more detail, the PLL 110 that is included in the calibration controller 100 compares a phase of the input calibration target frequency and a phase of the transmitted operation frequency. Thereafter, by reflecting a phase difference between the calibration target frequency and the operation frequency, the calibration controller 100 generates a frequency calibration value.

Further, the calibration controller 100 repeatedly performs a frequency calibration process, and when data are accumulated, the calibration controller 100 generates a calibration value appropriate for each wafer with reference to the data.

Thereafter, the calibration controller 100 includes a frequency calibration value that is generated by the above method in a control signal for calibrating a frequency, and transfers the control signal to the frequency regulator 261 through the calibration bus 234 (S19 and S20).

The frequency regulator 261, having received the control signal for calibrating a frequency, stores a frequency calibration value according to the control signal at the user memory 271, and changes an operation frequency that is generated by adjusting the operation frequency generator 252 according to the frequency calibration value (S21).

Thereafter, the calibration controller 100 transfers a selection release signal of the tag chip 200 (S22) and transfers the selection release signal to the buffer 210 through the chip selection bus 231 (S23), and thus the buffer 210 terminates operation (S24).

Finally, when operation of the buffer 210 is terminated, power that is supplied from the external power line 232 is intercepted and thus the tag chip 200 terminates operation (S25).

However, after step S22 is performed, power is no longer supplied to the tag chip 200, and thus the tag chip 200 may not calibrate an operation frequency and store a frequency calibration value, and thus the calibration controller 100 transmits a control signal, when a random time has elapsed, and step S22 may be performed.

Further, although not shown in FIG. 3, as the frequency regulator 261 performs a calibration/storage step of a frequency and transmits a completion message of the step to the calibration controller 100, the tag chip selection release step S22 of the calibration controller 100 may be performed.

According to an exemplary embodiment of the present invention, when performance of integrated circuit chips is calibrated at a wafer level, DC power is directly transmitted to the integrated circuit chips and thus a calibration operation can be performed more simply and efficiently than a case of receiving induction power. Further, by calibrating performance of an operation frequency generator that is sensitive to a production process change, calibration can be quickly performed, and thus a cost reduction effect can be obtained.

According to another exemplary embodiment of the present invention, by including a circuit for performing a calibration operation in a scribe area of a semiconductor wafer, a semiconductor wafer can be manufactured regardless of a yield of an integrated circuit chip, and by including a buffer to the circuit, an integrated circuit chip to calibrate can be easily selected, and by buffering a signal, even if a signal line is extended, calibration can be smoothly performed.

According to another exemplary embodiment of the present invention, by comparing and detecting a phase difference between a calibration target frequency and a frequency that is generated in an operation frequency generator using a calibration controller including a PLL, a frequency calibration value can be generated.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method of auto-calibrating integrated circuit chips at a wafer level by calibrating an operation frequency of the integrated circuit chips, the method comprising:
   supplying DC power to the integrated circuit chips;
   selecting an integrated circuit chip on which to perform calibration of an operation frequency;
   receiving an operation frequency that is generated in the selected integrated circuit chip;
   calculating a difference between a phase of the operation frequency that is generated in a selected integrated circuit chip and a phase of a calibration target frequency;
   generating a frequency calibration value of the operation frequency using the phase difference;
   transmitting a control signal comprising the frequency calibration value to the integrated circuit chip; and
   releasing a selection of the integrated circuit chip in which calibration of the operation frequency is complete.

2. The method of claim 1, further comprising:
   after the transmitting of a control signal,
   calibrating the operation frequency according to the frequency calibration value that is included in the control signal; and
   storing the frequency calibration value at the integrated circuit chip according to the control signal.

3. The method of claim 1, further comprising:
   selecting an integrated circuit chip of at least one integrated circuit chip on which to perform calibration of the operation frequency.

4. A semiconductor wafer for auto-calibrating an operation frequency of integrated circuit chips, the semiconductor wafer comprising:
   an integrated circuit chip area;

a probe area in which a calibration controller of the operation frequency is connected to the outside of the semiconductor wafer, wherein the calibration controller includes a phase-locked loop that calculates a phase difference by comparing a phase of a calibration target frequency and a phase of the operation frequency, and generates an operation frequency calibration value using the phase difference;

a signal transmitting area that is connected to the probe area to transmit a signal of the integrated circuit chips to the calibration controller; and a buffer that relays a signal that is exchanged between the integrated circuit chips and the signal transmitting area.

5. The semiconductor wafer of claim 4, wherein the signal transmitting area comprises:

a chip selection bus that transmits a selection signal of the calibration controller for an integrated circuit chip to perform calibration of the operation frequency and a selection release signal for the integrated circuit chip in which calibration of the operation frequency is complete;

an external power line that transmits DC power that is supplied to the integrated circuit chip;

a frequency measurement line that transmits an operation frequency that is generated in the integrated circuit chip; and a calibration bus that transmits a control signal for calibrating the operation frequency, wherein the chip selection bus, the external power line, the frequency measurement line, and the calibration bus are connected to the probe area.

6. The semiconductor wafer of claim 5, wherein the buffer is positioned at an end portion of the chip selection bus and operates according to a selection signal and a selection release signal of the calibration controller, and when the buffer operates, a connection between the integrated circuit chip, the external power line, the frequency measurement line, and the calibration bus is activated.

7. A calibration controller for auto-calibrating an operation frequency of integrated circuit chips, the calibration controller generating an operation frequency calibration value using a phase difference, and comprising:

an external power device that supplies DC power to the integrated circuit chips;

a chip selection device that transmits a selection signal that selects an integrated circuit chip on which to perform calibration of the operation frequency and transmits a selection release signal that releases the integrated circuit chip; and a phase-locked loop that calculates the phase difference by comparing a phase of a calibration target frequency and a phase of the operation frequency;

wherein the calibration controller is configured to transmit the selection signal to select a tag chip of a plurality of tag chips of a semiconductor wafer for operation frequency calibration based on the operation frequency calibration value, and to transmit the selection release signal to release the selected tag chip after the operation frequency calibration is complete.

* * * * *